US008427505B2

(12) United States Patent
Karp et al.

(10) Patent No.: US 8,427,505 B2
(45) Date of Patent: Apr. 23, 2013

(54) GEOSPATIAL MODELING SYSTEM FOR IMAGES AND RELATED METHODS

(75) Inventors: John Karp, Indialantic, FL (US); Tom McDowall, Melbourne, FL (US); Mark Rahmes, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 777 days.

(21) Appl. No.: 12/268,775

(22) Filed: Nov. 11, 2008

(65) Prior Publication Data

US 2010/0118053 A1    May 13, 2010

(51) Int. Cl.
G09G 5/00    (2006.01)
G06K 9/00    (2006.01)

(52) U.S. Cl.
USPC .......................................... 345/630; 382/154

(58) Field of Classification Search .................. 345/630, 345/418–419; 382/294–295, 209, 113; 702/5
See application file for complete search history.

(56) References Cited

U.S. PATENT DOCUMENTS

| | | | | |
|---|---|---|---|---|
| 6,654,690 | B2 | 11/2003 | Rahmes | 702/5 |
| 7,187,809 | B2 | 3/2007 | Zhao et al. | 382/285 |
| 7,191,066 | B1 | 3/2007 | Rahmes | 702/5 |
| 7,298,891 | B2 | 11/2007 | McDowall et al. | 382/154 |
| 7,567,731 | B2 | 7/2009 | McDowall et al. | |
| 7,983,474 | B2 | 7/2011 | Van Workum et al. | |
| 2005/0271264 | A1 * | 12/2005 | Ito et al. | 382/154 |
| 2006/0013443 | A1 | 1/2006 | McDowall et al. | 382/109 |
| 2007/0025595 | A1 * | 2/2007 | Koizumi et al. | 382/103 |
| 2007/0265781 | A1 | 11/2007 | Nemethy et al. | 702/5 |
| 2008/0089558 | A1 | 4/2008 | Vadon et al. | 382/113 |
| 2009/0304236 | A1 * | 12/2009 | Francini et al. | 382/109 |

OTHER PUBLICATIONS

Gruen, "Adaptive Least Squares Correlation: a powerful image matching technique", S Afr J. of Photogrammetry, Remote Sensing and Cartography 14(3), 1985, p. 175-187.*
Sagawa et al. "Effective Nearest Neighbor Search for Aligning and Merging Range Images", 3D Digital Imaging and Modeling 2003, 3DIM 2003 Proceeding, Fourth International Conference, Oct. 2003, p. 1-8.*
Deng et al., "Registration of LIDAR and optical images using multiple geometric features", Proc of SPIE vol. 6787, pp. 1-5, 2007.
Huber et al., "Fusion of LIDAR Data and Aerial Imagery for Automatic Reconstruction of Building Surfaces", 2003.
Chen et al., "Fusion of LIDAR Data and Optical Imagery for Building Modeling", Commission WG IV/7, 2003.

* cited by examiner

Primary Examiner — Tize Ma
Assistant Examiner — Yingchun He
(74) Attorney, Agent, or Firm — Allen, Dyer, Doppelt, Milbrath & Gilchrist, P.A.

(57) ABSTRACT

A geospatial modeling system may include a geospatial model database for storing images of a geographical area and a reference digital surface model (DSM) of the geographical area. The images each have associated with them respective first geolocation data with a first accuracy. The reference DSM may include second geolocation data with a second accuracy being greater than the first accuracy. The geospatial modeling system may further include a processor cooperating with the geospatial model database for generating an initial DSM based upon overlapping portions of the images, and aligning the initial DSM based upon the reference DSM to generate a georeferenced DSM having a third accuracy greater than the first accuracy.

20 Claims, 15 Drawing Sheets

GEOSPATIAL MODELING SYSTEM FOR IMAGES AND RELATED METHODS

FIELD OF THE INVENTION

The present invention relates to the field of geospatial modeling, and, more particularly, to geospatial modeling of images and a digital surface model and related methods.

BACKGROUND OF THE INVENTION

Topographical models of geographical areas may be used for many applications. For example, topographical models may be used in flight simulators and other planning missions. Furthermore, topographical models of man-made structures, for example, cities, may be extremely helpful in applications, such as, cellular antenna placement, urban planning, disaster preparedness and analysis, and mapping.

Various types of topographical models are presently being used. One common topographical model is the digital elevation model (DEM). A DEM is a sampled matrix representation of a geographical area, which may be generated in an automated fashion by a computer. In a DEM, coordinate points are made to correspond with a height value. DEMs are typically used for modeling terrain where the transitions between different elevations, for example, valleys, mountains, are generally smooth from one to a next. That is, a basic DEM typically models terrain as a plurality of curved surfaces and any discontinuities therebetween are thus "smoothed" over. Another common topographical model is the digital surface model (DSM). The DSM is similar the DEM but may be considered as further including details regarding buildings, vegetation, and roads in addition to information relating to terrain.

One particularly advantageous 3D site modeling product is RealSite® from the Harris Corporation of Melbourne, Fla. (Harris Corp.), the assignee of the present application. RealSite® may be used to register overlapping images of a geographical area of interest and extract high resolution DEMs or DSMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR), for example.

Another similar system from the Harris Corp. is LiteSite®. LiteSite® models provide automatic extraction of ground, foliage, and urban digital elevation models (DEMs) from LIDAR and synthetic aperture radar (SAR)/interfermetric SAR (IFSAR) imagery. LiteSite® can be used to produce affordable, geospatially accurate, high-resolution 3-D models of buildings and terrain.

U.S. Pat. No. 6,654,690 to Rahmes et al., which is also assigned to the present assignee and is hereby incorporated herein in its entirety by reference, discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

Although stereographic generation of DSMs using the overlapping images of a geographical area of interest may produce detailed results, there may be some potential drawbacks. For example, each image has associated geolocation data, i.e. the geolocation of the image. Although the images may be detailed, the geolocation data may have an undesirable low accuracy. Indeed, once the images are stereographically processed to provide a DSM, the accuracy may further deteriorate, which may be undesirable in applications that depend on detailed DSMs.

An approach to georeferencing images of geographical areas is disclosed in U.S. Patent Application Publication No. 2008/0089558 to Vadon et al. This method includes producing of a digital relief form, from a pair of digital images, and processing the intermediate digital relief form and the reference digital form by calculating the position offsets between the points of the digital reference relief form and their equivalents in the intermediate digital relief form with a view to refining the picture model of the digital image to be georeferenced. The method also includes generating a digital relief form, called the final digital relief form, from the pair of digital images and from the refined picture model, and projecting the final digital relief form and the digital image on the ground, in a geographical or cartographic system.

SUMMARY OF THE INVENTION

In view of the foregoing background, it is therefore an object of the present invention to provide a geospatial modeling system with more accurate geolocation data.

This and other objects, features, and advantages in accordance with the present invention are provided by a geospatial modeling system comprising a geospatial model database and a processor. The geospatial model database may be for storing a plurality of images of a geographical area and a reference digital surface model (DSM) of the geographical area. The plurality of images each may have associated therewith respective first geolocation data with a first accuracy. The reference DSM may include second geolocation data with a second accuracy being greater than the first accuracy. The processor may cooperate with the geospatial model database for generating an initial DSM based upon overlapping portions of the images, and aligning the initial DSM based upon the reference DSM to generate a georeferenced DSM having a third accuracy greater than the first accuracy. Advantageously, the georeferenced DSM is more accurate than the images and associated first geolocation data.

Additionally, the third accuracy may be greater than the second accuracy. The processor may further cooperate with the geospatial model database for generating updated respective first geolocation data for each of the plurality of images based upon the georeferenced DSM.

In certain embodiments, the processor may further cooperate with the geospatial model database for generating the third accuracy based upon least squares calculations. Moreover, the aligning may be based upon iterative closest point (ICP) calculations. The processor may further cooperate with the geospatial model database for aligning based upon the ICP calculations using a binary search tree.

Furthermore, the generating of the initial DSM may comprise correlating patches from the images to form a correlation surface, determining peaks of the correlation surface, and determining correspondence pairs based upon respective locations of the peaks of the correlation surface. More specifically, the images may comprise aerial earth images. Also, the reference DSM may be based upon Light Detection and Ranging (LIDAR) data.

Another aspect is directed to a computer implemented method for geospatial modeling using a plurality of images of a geographical area and a DSM of the geographical area. The images each have associated therewith respective first geolocation data with a first accuracy. The reference DSM may include second geolocation data with a second accuracy being greater than the first accuracy. The method may comprise generating an initial DSM based upon overlapping portions of the images, and aligning the initial DSM based upon the reference DSM to generate a georeferenced DSM having a third accuracy greater than the first accuracy. The method may also include displaying at least one image based upon the georeferenced DSM.

BRIEF DESCRIPTION OF THE DRAWINGS

FIG. 1b is a more detailed schematic diagram of the geospatial modeling system of FIG. 1a.

DETAILED DESCRIPTION OF THE PREFERRED EMBODIMENTS

Figure 1A:
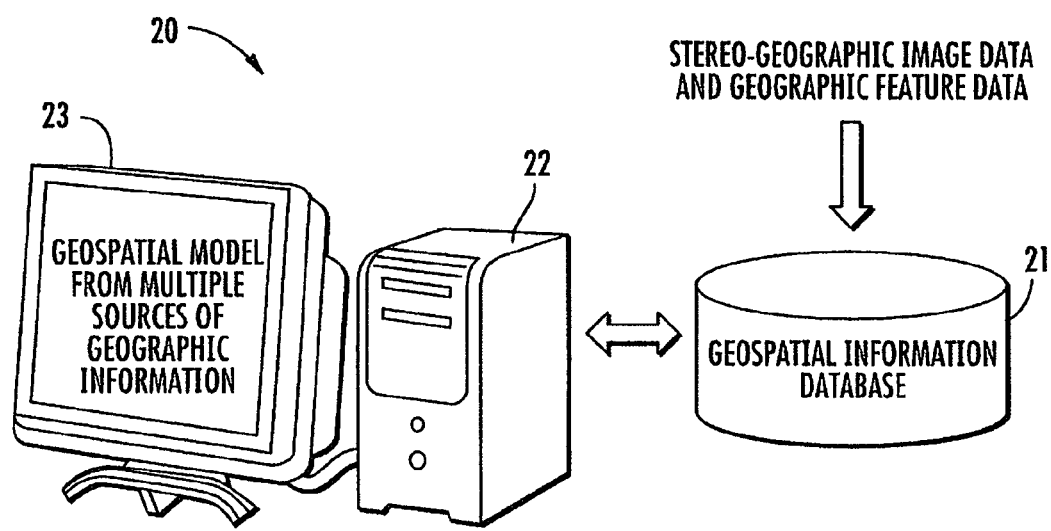
FIG. 1a is a schematic diagram of a geospatial modeling system according to the present invention.
Figure 1B:
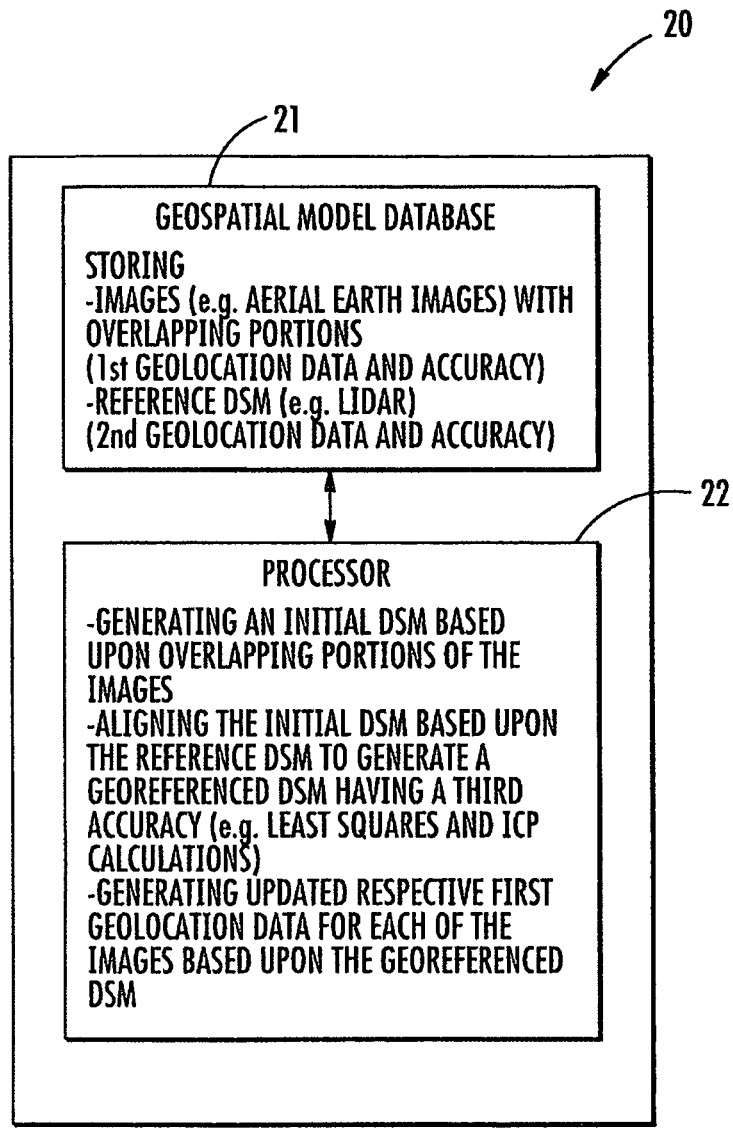
Figure 2:
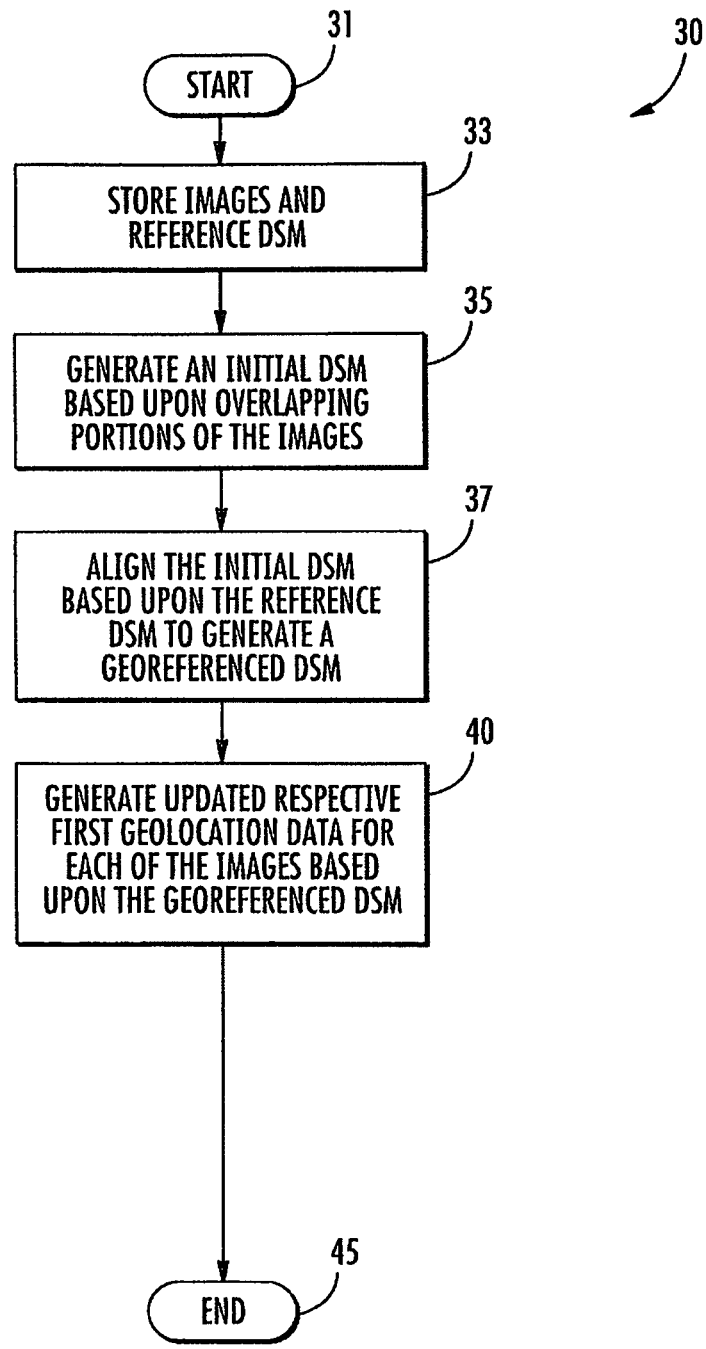
FIG. 2 is a flowchart illustrating a computer implemented method for geospatial modeling according to the present invention.
Figure 3:
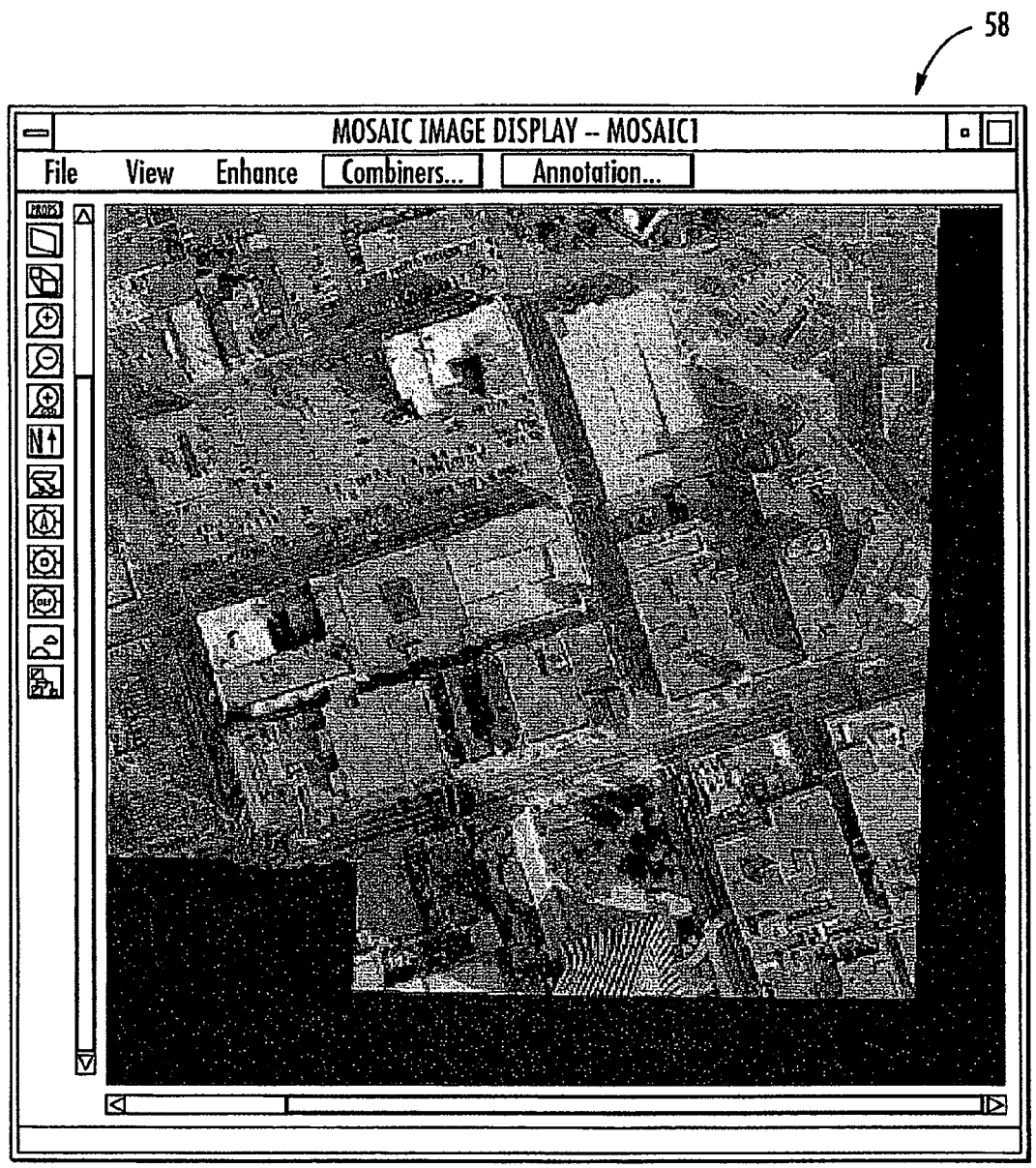
FIG. 3 is a computer display screen print image mosaic of aerial earth images for input into the geospatial modeling system of FIGS. 1a and 1b.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1-5, a geospatial modeling system 20 according to the present invention is now described. Moreover, with reference to the flowchart 30 of FIG. 2, another aspect directed to a computer implemented method for geospatial modeling is also now described, which begins at Block 31. The geospatial modeling system 20 illustratively includes a geospatial model database 21, a processor 22, illustrated as a personal computer (FIG. 1a), coupled thereto, and a display 23 also coupled to the processor 22. By way of example, the processor 22 may be a central processing unit (CPU) of a PC, Mac, or other computing workstation.

The geospatial model database 21 illustratively stores (Block 33) a plurality of images 71a-71e (FIG. 5) of a geographical area 75, for example, aerial earth images 58 (FIG. 3), aerial optical earth images, and aerial earth infrared images. As will be appreciated by those skilled in the art, the images 71a-71e may be derived from available global databases, for example, the National Geodetic Survey (NGS) or the National Geospatial Intelligence Agency (NGA).

The images 71a-71e each may have associated therewith respective first geolocation data with a first accuracy. More specifically, the first geolocation data may include, for example, longitude and latitude coordinates and a corresponding uncertainty. As will be appreciated by those skilled in the art, the uncertainty for the first geolocation data may comprise collection platform uncertainties.

The geospatial model database 21 also illustratively stores (Block 33) a reference digital surface model (DSM) of the geographical area 75. As will be appreciated by those skilled in the art, the reference DSM may be collected using a mobile Light Detection and Ranging (LIDAR) platform. The reference DSM includes second geolocation data with a second accuracy being greater than the first accuracy. In other words, the uncertainty associated with the second geolocation data is lower than that of the first geolocation data. Nonetheless, although the reference DSM may have relatively greater accuracy and lower uncertainty, the reference DSM may have less detail than the initial DSM.

The processor 22 illustratively cooperates with the geospatial model database 21 for generating (Block 35) an initial DSM. For example, the processor 22 may generate the initial DSM based upon overlapping portions 72a-72d of the images 71a-71e, i.e. stereographic generation. Moreover, for greater stereographic accuracy, the processor 22 may use known truths, for example, roads, rivers, and lake boundaries, and corresponding geolocation data to more accurately generate the initial DSM.

As will be appreciated by those skilled in the art, the images may be collected from an airborne mobile platform. The mobile platform may take a flight path 73a-73b over the geographic location 75 and take the images 71a-71e thereover. The stereo separation between the images 71a-71e is preferably above 6 degrees, for example. The accuracy of the initial DSM may be increased with greater stereo separation. Relative to the reference DSM, the initial DSM typically has a greater level of detail but lower accuracy.

Figure 4:
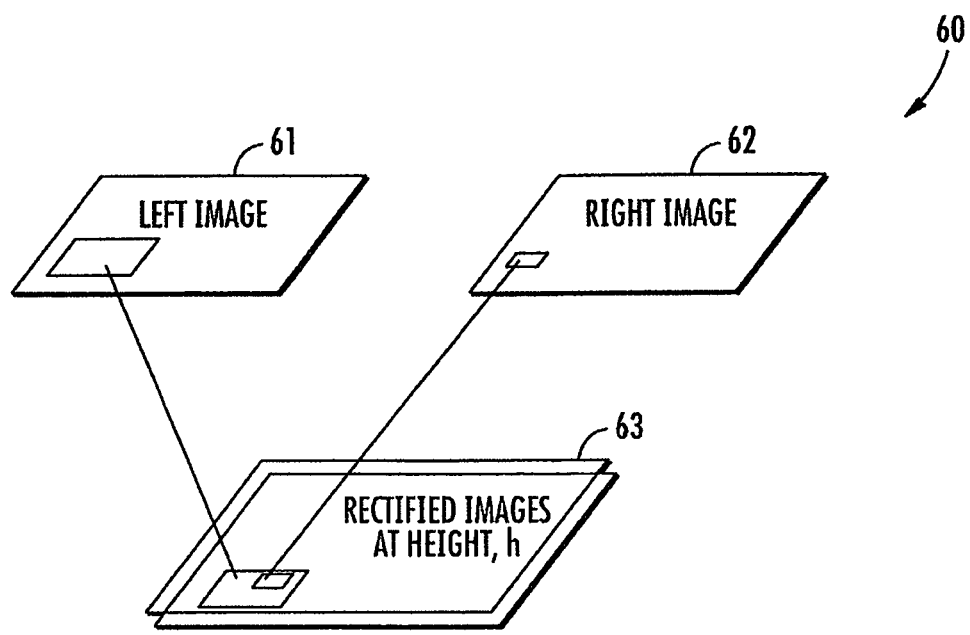
FIG. 4 a schematic diagram illustrating generation of the initial DSM in the geospatial modeling system of FIGS. 1a and 1b.
Figure 5:
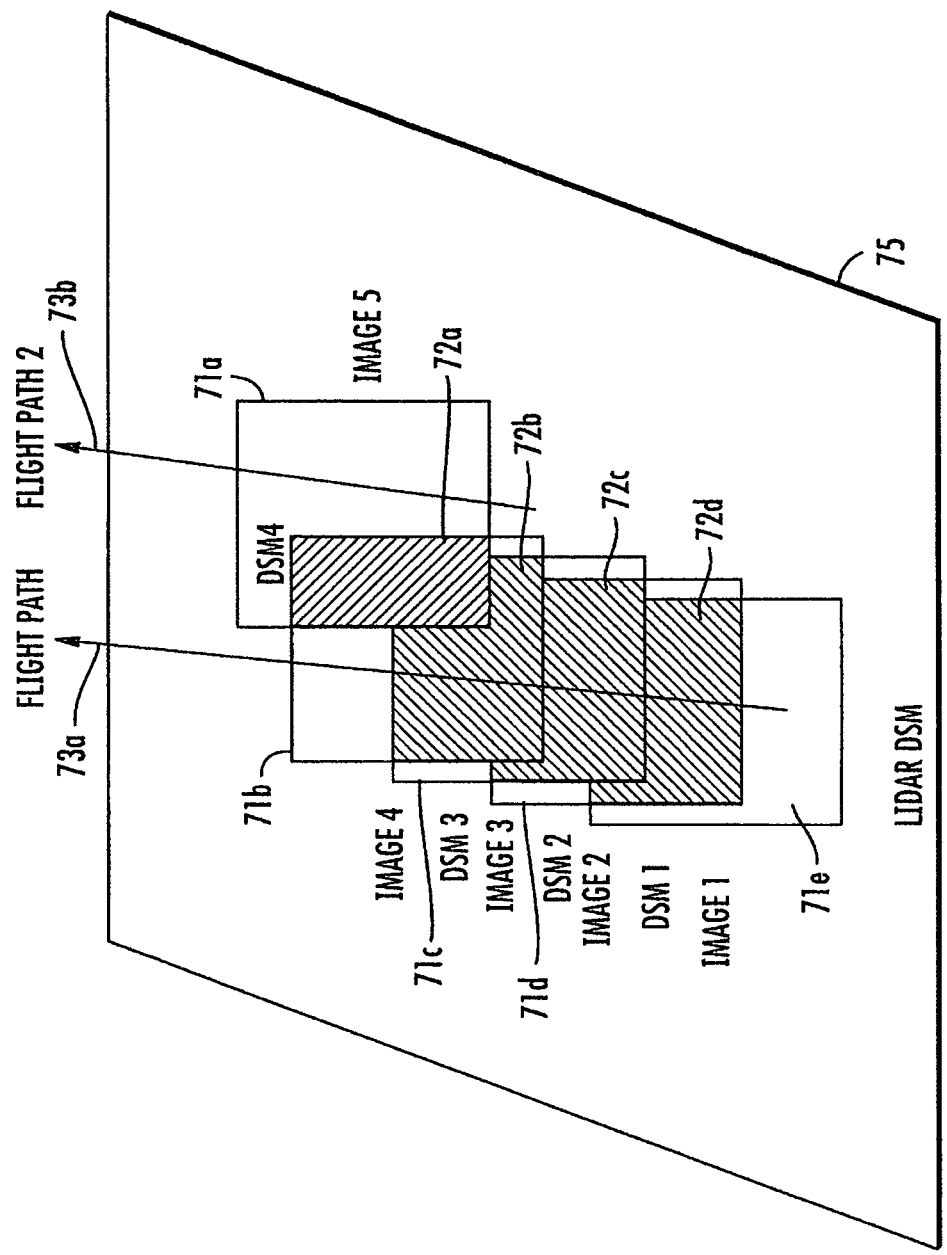
FIG. 5 a schematic diagram illustrating collection of the plurality of images with overlapping portions in the geospatial modeling system of FIGS. 1a and 1b.

Referring briefly to FIG. 4 and the diagram 60 therein, in certain embodiments, the processor 22 may cooperate with the geospatial model database 21 for generating the initial DSM by correlating patches 61-62 from the images 71a-71e to form a correlation surface 63. In certain advantageous embodiments, the patches may approach the resolution of the images 71a-71e in size. The processor 22 also determines peaks of the correlation surface 63 and correspondence pairs based upon respective locations of the peaks of the correlation surface. In yet other embodiments, the processor 22 may generate the initial DSM using the method disclosed in U.S. Patent Application Publication No. 2007/0265781 to Nemethy et al., also assigned to the present application's assignee, and the entire contents of which are incorporated by reference herein.

The processor 22 illustratively cooperates with the geospatial model database 21 for aligning (Block 37) the initial DSM based upon the reference DSM to generate a georeferenced DSM. In other words, the processor 22 superimposes the relatively detailed initial DSM over the less detailed, but more accurate in geolocation, reference DSM. Advantageously, the georeferenced DSM has a third accuracy greater than the first accuracy and the second accuracy. More specifically, the geospatial modeling system 20 leverages the detail of the initial DSM with the accurate geolocation of the reference DSM.

In some embodiments, the processor 22 may align the initial DSM and the reference DSM based upon iterative closest point (ICP) calculations. More specifically, the processor 22 compares each point of data in the initial DSM to each point in the reference DSM to determine a closest point. The mean of match points from the initial DSM and the reference DSM is then determined. The processor 22 computes a distance of each match point from the mean of the DSM, and solves for rotation and translation. The transformation is then applied to the reference DSM. This process may be applied iteratively to move the DSMs closer to each other.

In certain embodiments, the processor 22 may further cooperate with the geospatial model database 21 for generating the third accuracy based upon least squares calculations. More specifically, while generating the initial DSM from the images 71a-71e, the stereographic calculations used to derived the initial DSM for the first three images 71e, 71d, 71c in the first flight path 73a may be combined via least squares. For example, the calculations used to process Image 1 71e and Image 2 71d may be used again in the calculations for Image 2 and Image 3 71c. Accordingly, the generated initial DSM is more accurate, thereby improving the accuracy of the georeferenced DSM.

Furthermore, the processor 22 illustratively cooperates with the geospatial model database 21 for generating (Block 40) updated respective first geolocation data for each of the plurality of images 71a-71e based upon the georeferenced DSM. In other words, the geospatial modeling system 20 uses the superior accuracy of the georeferenced DSM to improve the first geolocation data of the images 71a-71e. More specifically, the processor 22 reverses the process for generation of the initial DSM, for example, stereographic calculations, and performs it on the georeferenced DSM to derive new geolocation data for the images 71a-71e. The method ends at Block 45.

Figures 6A, 6B:
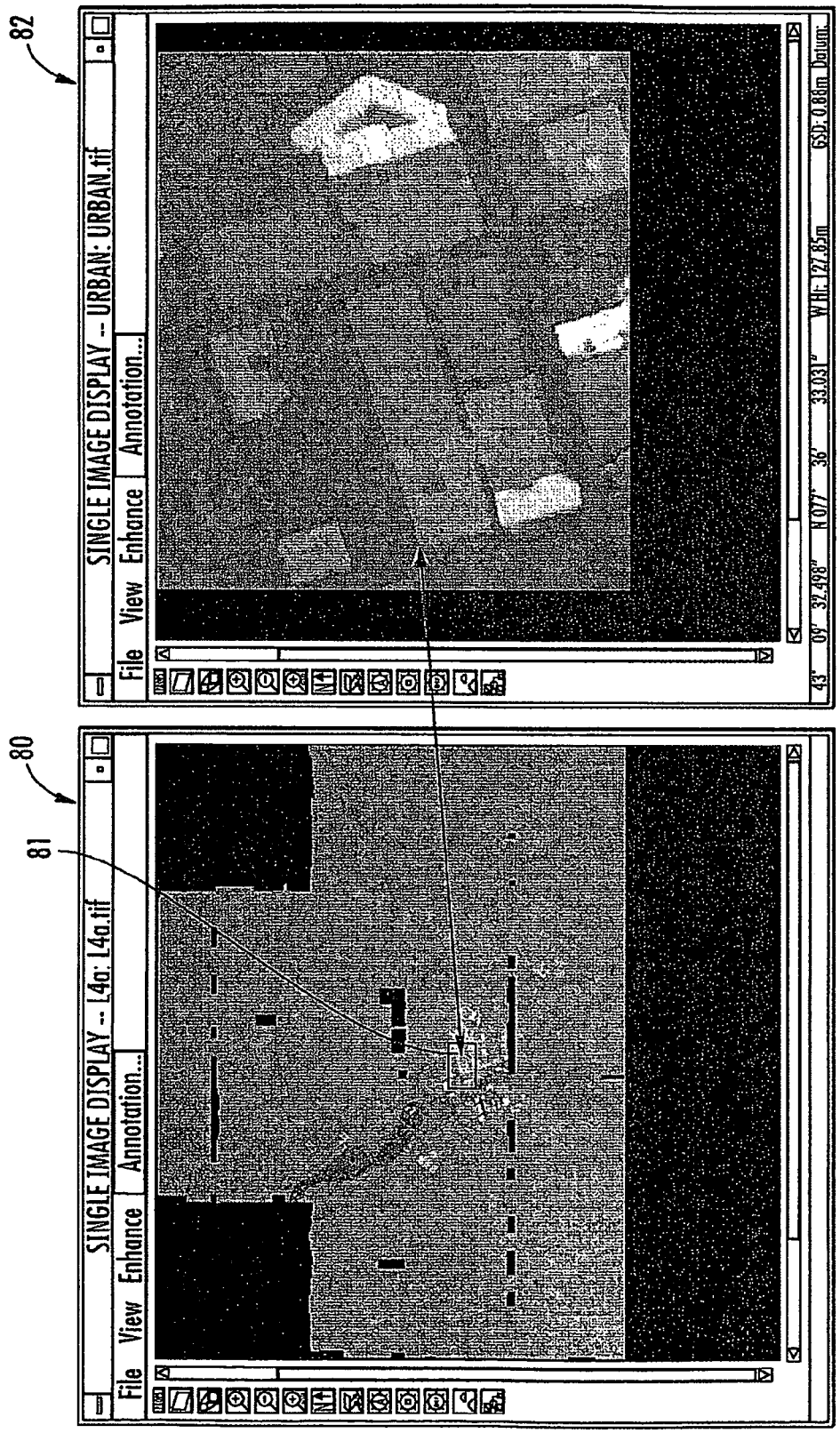
FIGS. 6a-6b are computer display screen print images illustrating the initial DSM in the geospatial modeling system of FIGS. 1a and 1b.
Figure 7:
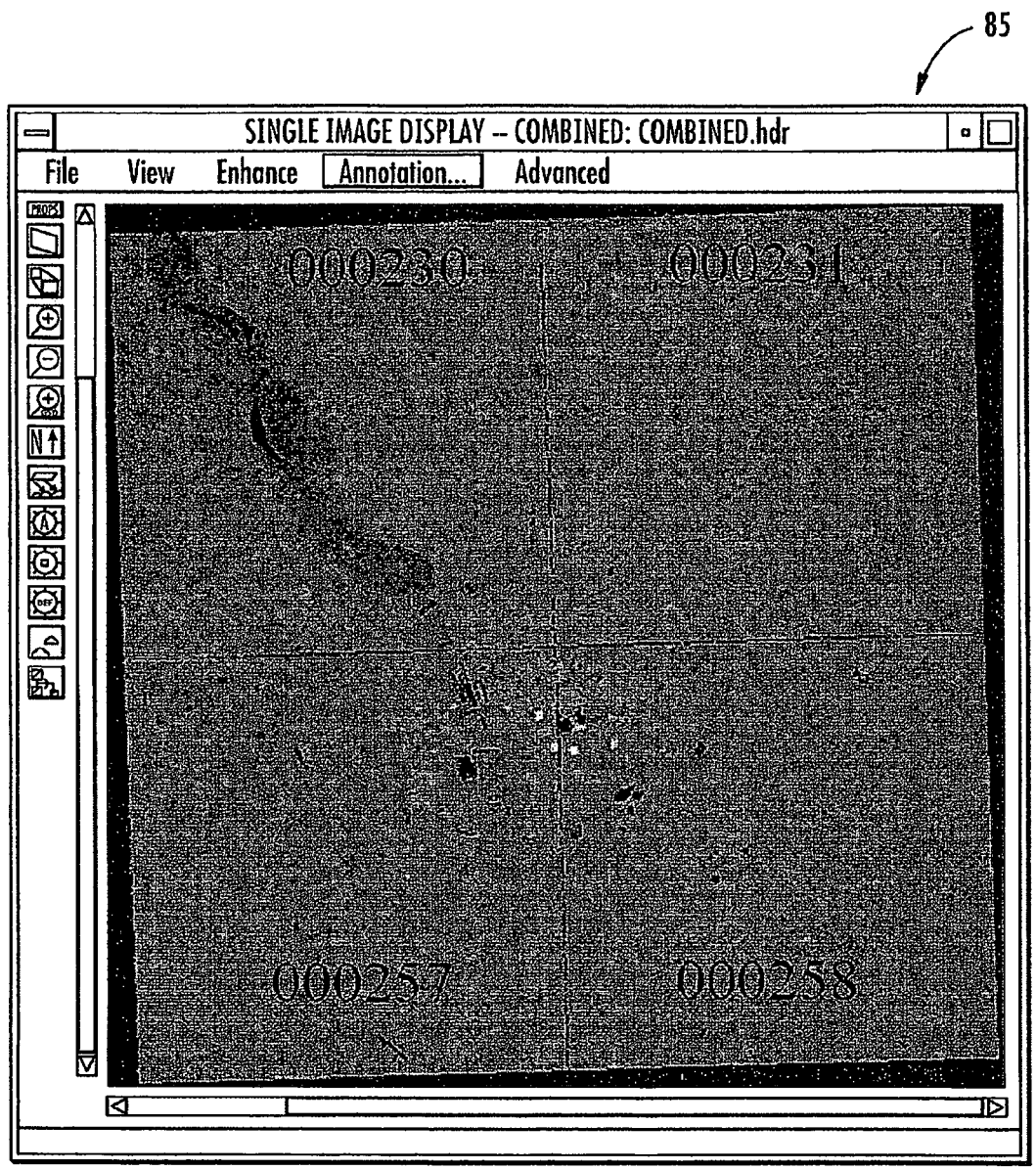
FIG. 7 is a computer display screen print image illustrating the reference DSM in the geospatial modeling system of FIGS. 1a and 1b.
Figures 8A, 8B:
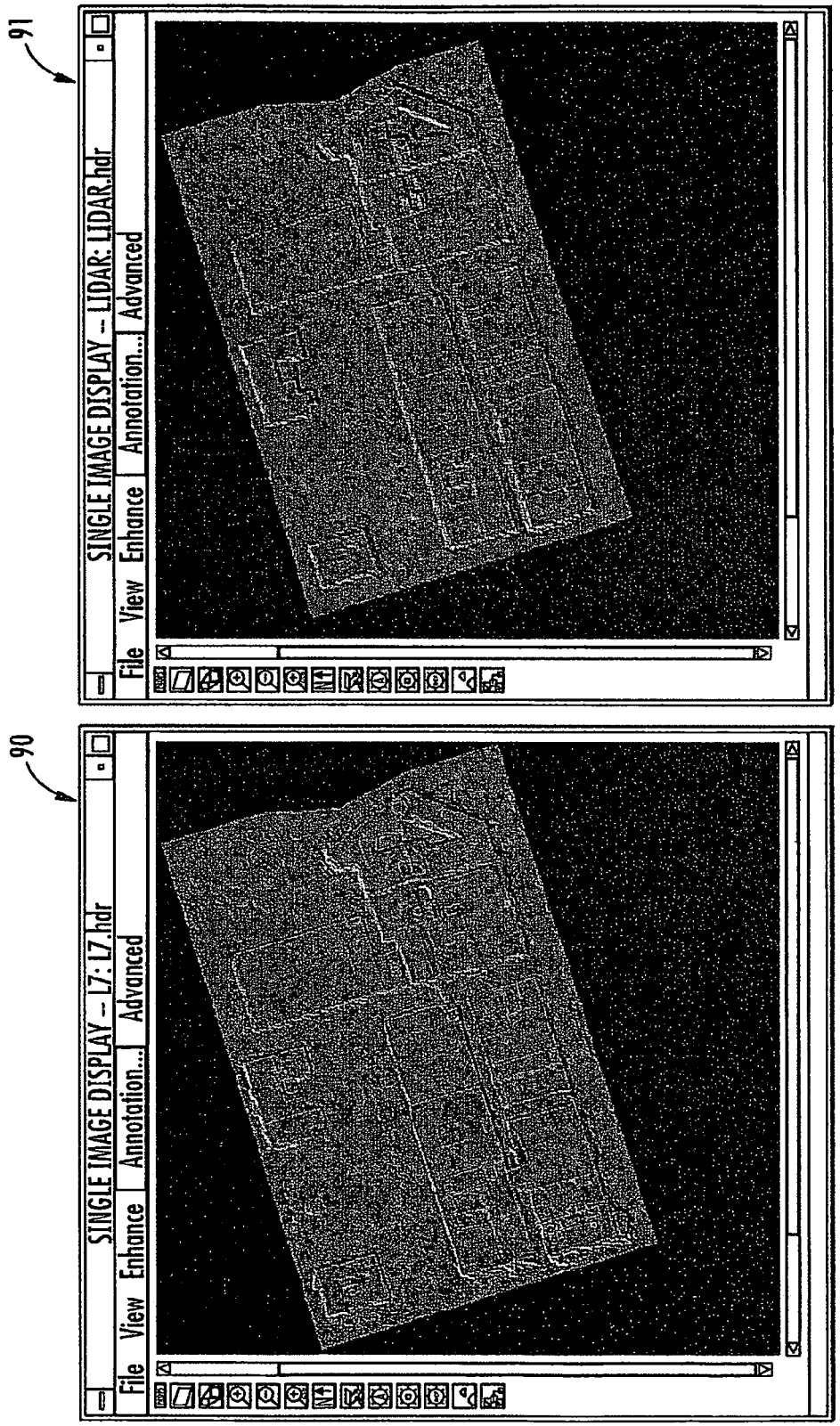
FIGS. 8a-8b are computer display screen print images illustrating an aerial view of the georeferenced DSM of the geospatial modeling system of FIGS. 1a and 1b.
Figure 9B:
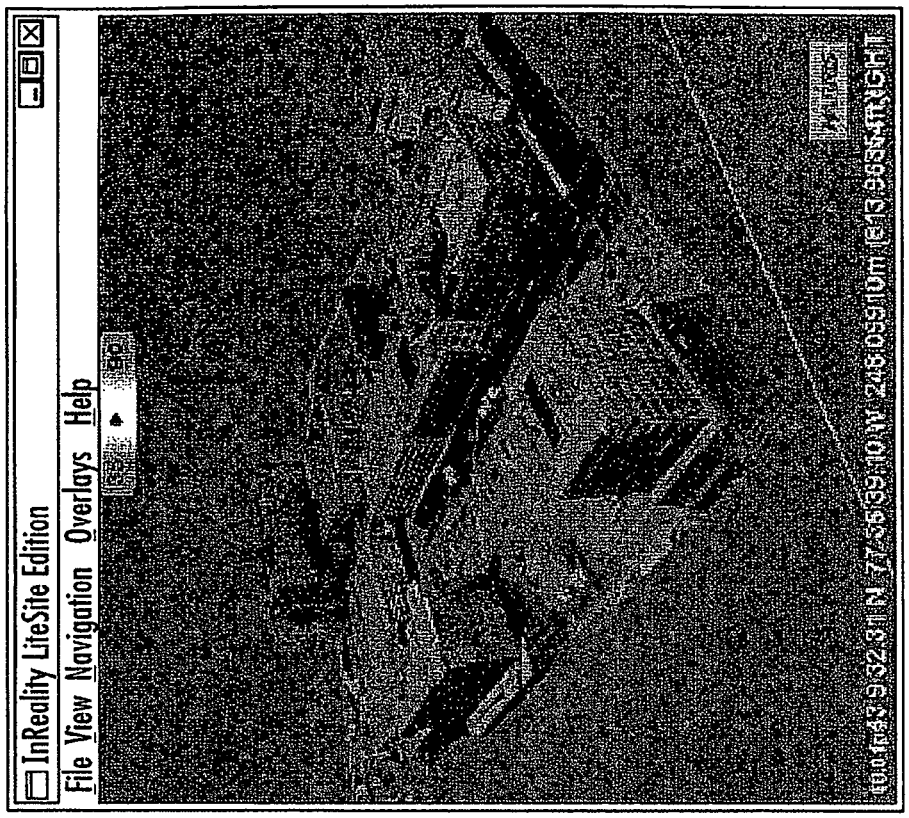
FIGS. 9a-9b are computer display screen print images illustrating a building vector view of the georeferenced DSM of the geospatial modeling system of FIGS. 1a and 1b.
Figure 9A:
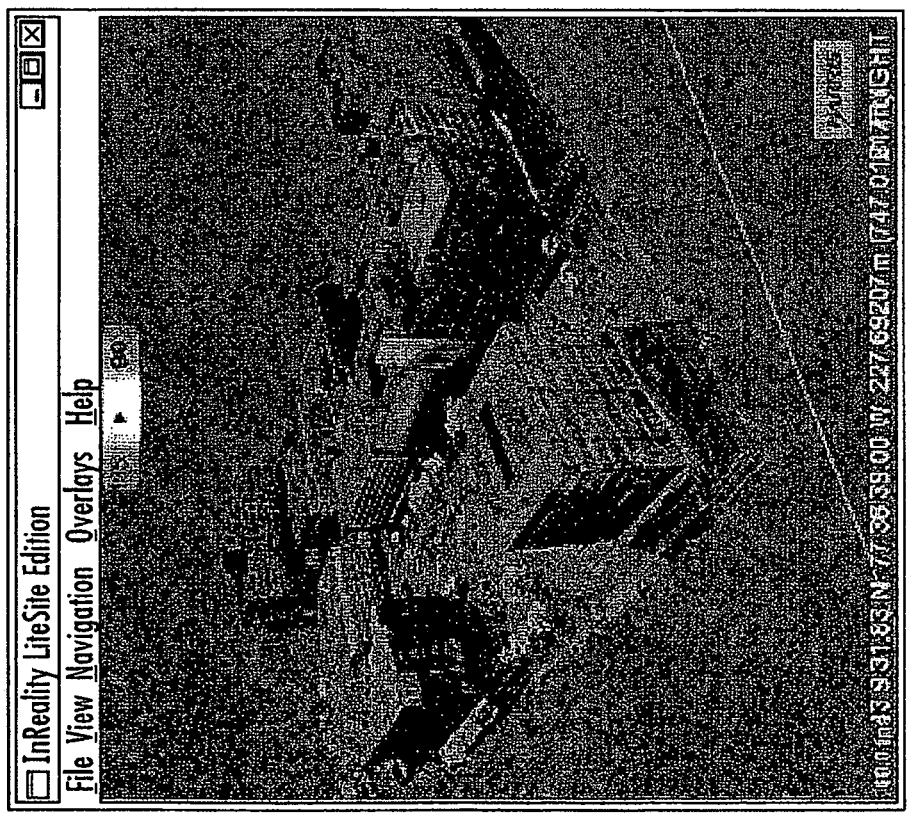
Figure 10B:
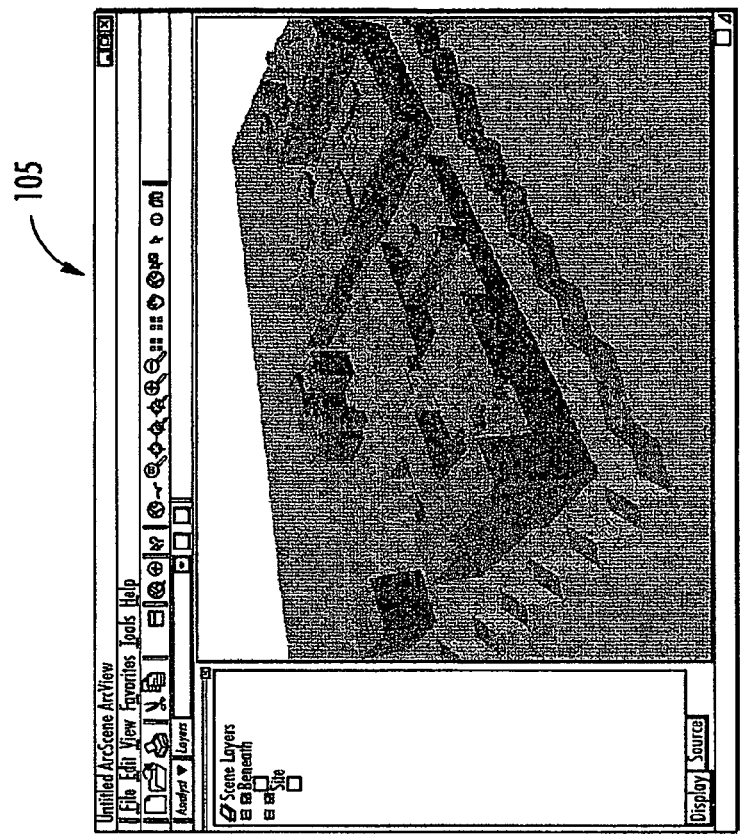
FIGS. 10a-10b are computer display screen print images illustrating a shape file view of the georeferenced DSM of the geospatial modeling system of FIGS. 1a and 1b.
Figure 10A:
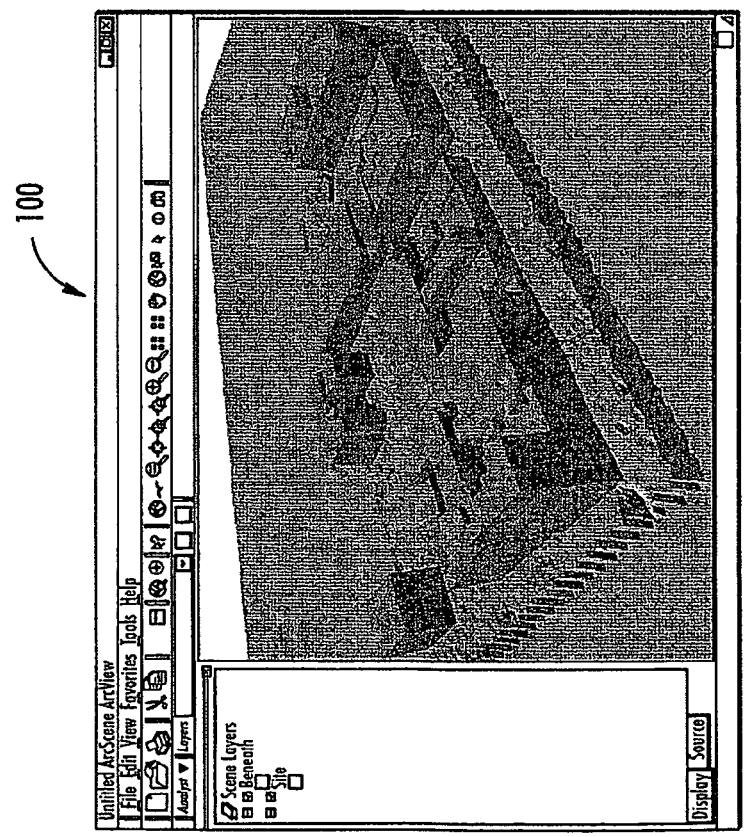

Referring briefly and additionally to FIGS. 6a-6b, and 7, an image 80 illustrates an example of the generated initial DSM. The image 80 illustratively includes a highlight box 81, which is shown in detail in a second image 82. As will be appreciated by those skilled in the art, the light shaded regions indicate a greater return of data than the darker regions. An image 85 illustrates an example of the reference DSM used by the geospatial modeling system 20. More specifically, this image 85 includes LIDAR DSM tiles at a resolution of 1 meter.

Referring briefly and additionally to FIGS. 8a-8b, 9a-9b, and 10a-10b, images 90-91 illustrate an enlarged portion of the reference DSM 91 and the corresponding georeferenced DSM portion 90. Advantageously, the georeferenced portion image 90 has increased resolution to 0.1 meters versus the lesser resolution of 1 meter for the reference DSM diagram portion 91. Images 95 and 96 again illustrate a greater resolution georeferenced DSM and the reference DSM, respectively, in "InReality View" in the RealSite® and LiteSite® applications. Images 100 and 105 again illustrate a greater resolution georeferenced DSM and the reference DSM, respectively, in shapefile format in the RealSite® and LiteSite® applications.

Figure 11:
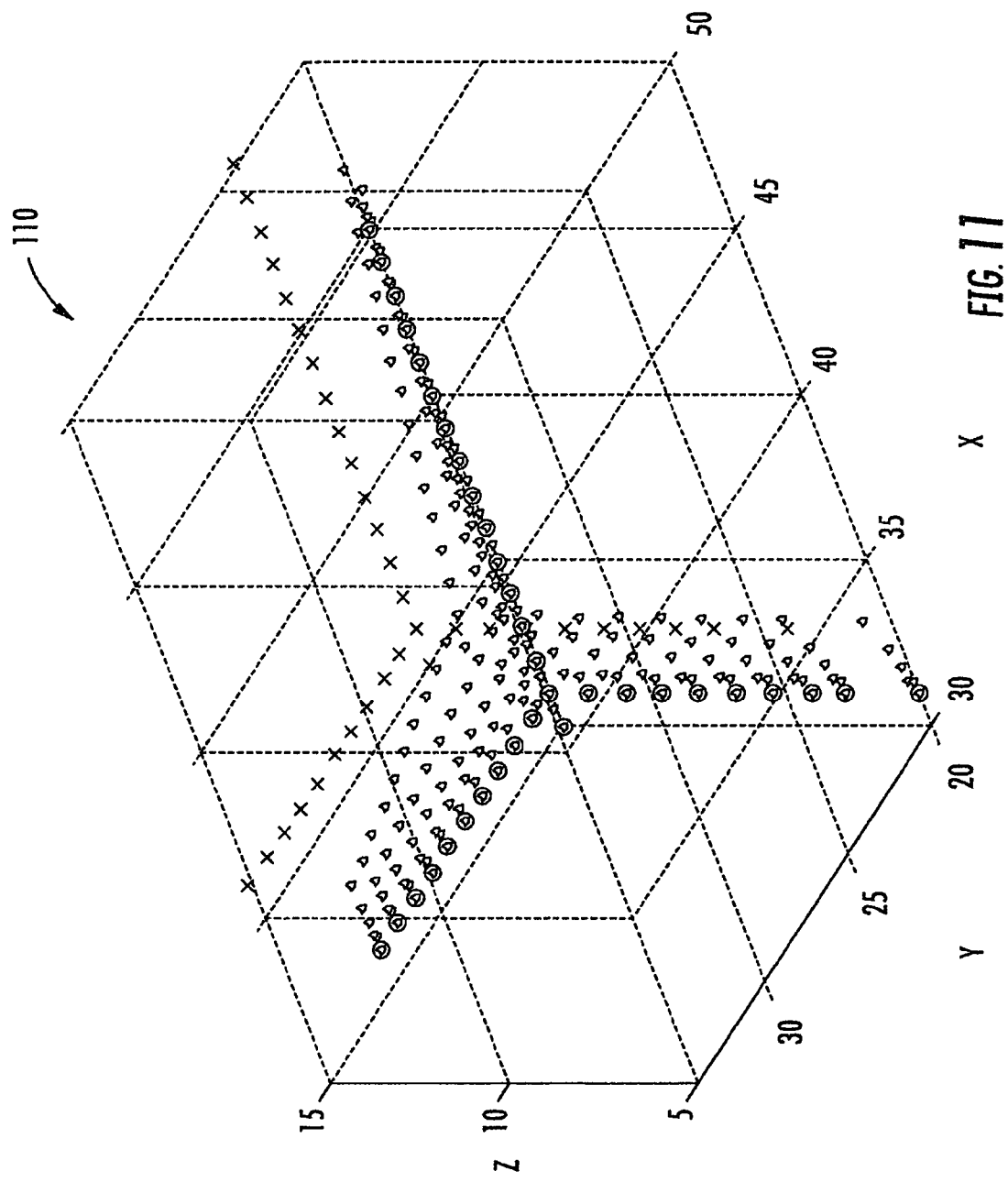
FIG. 11 is a three-dimensional chart illustrating the alignment of the initial and reference DSMs in the geospatial modeling system of FIGS. 1a and 1b.

Referring briefly and additionally to FIG. 11, a diagram 110 illustrates the ICP alignment process of the processor 22 for the initial DSM and reference DSM. Illustratively, the points are moved 5 units in the x-direction and 4 units in the y-direction.

Figure 12:
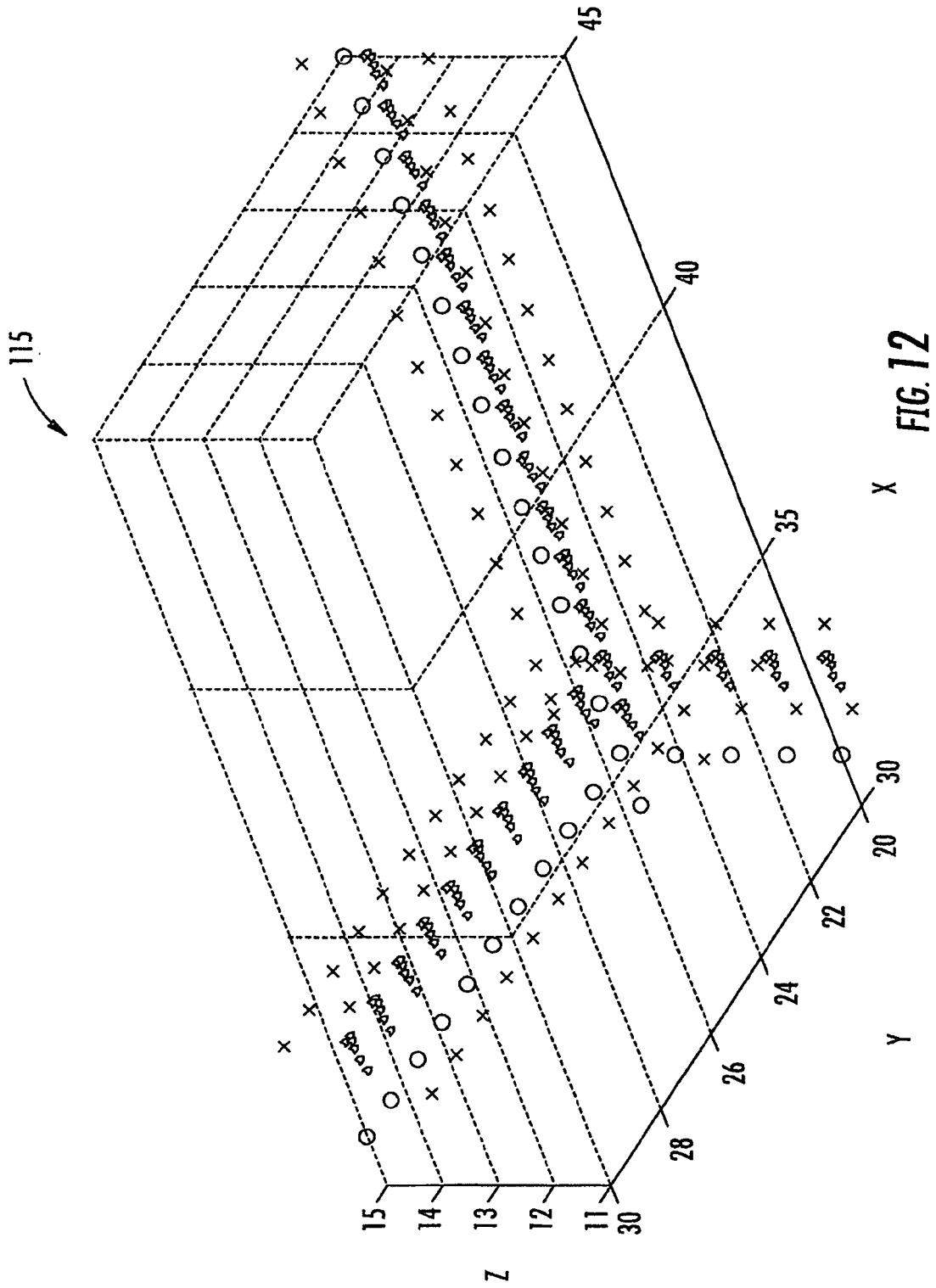
FIG. 12 is another three-dimensional chart illustrating the alignment of the initial and reference DSMs in the geospatial modeling system of FIGS. 1a and 1b.

Referring briefly and additionally to FIG. 12, a diagram 115 illustrates the use of least squares calculations by the processor 22. In this diagram 115, the X marks indicate observed values during the process and O marks indicate the calculated truth values. As will be appreciated by those skilled in the art, the geospatial modeling system 20 may leverage DSM registration weighted least squares batch adjustment strategy and use ICP with statistical distance association metric to estimate transform between pairs of volumes.

Figure 14:
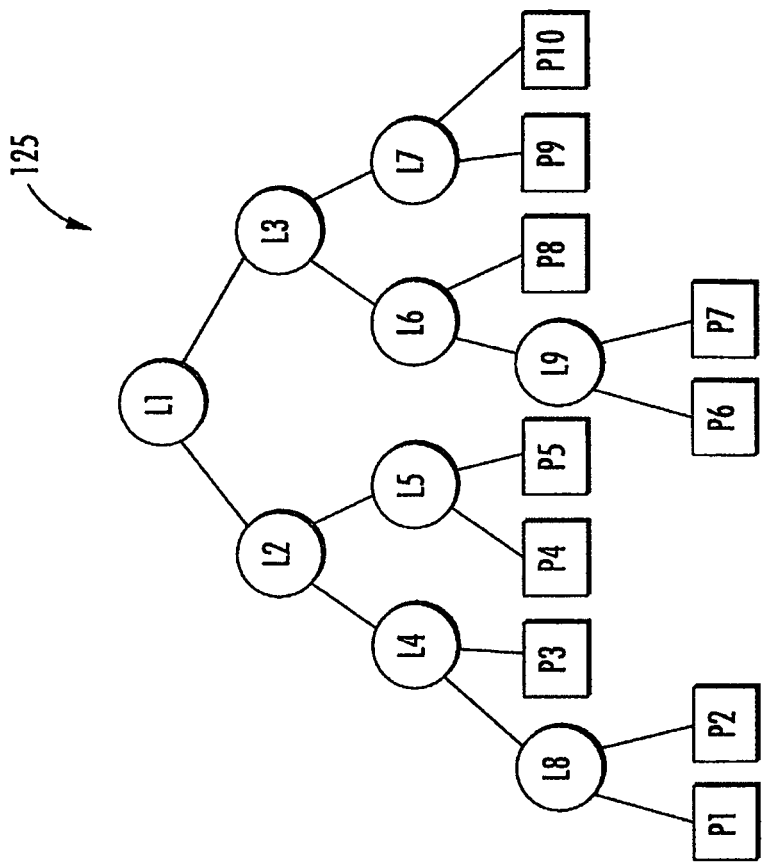
FIG. 14 is a diagram illustrating a binary search tree used in the ICP calculations in the geospatial modeling system of FIGS. 1a and 1b.
Figure 13:
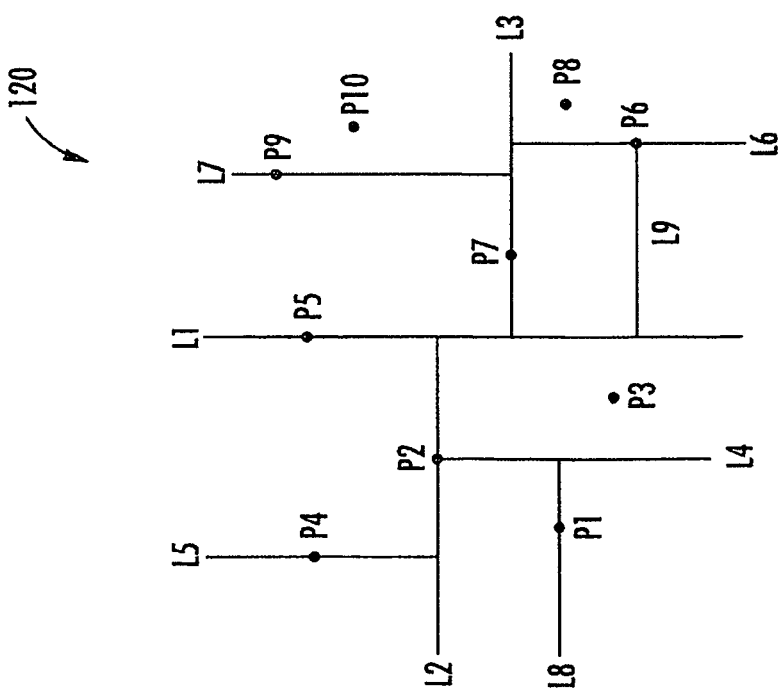
FIG. 13 is a two-dimensional set of points representing a surface for one frame of points in the DSMs of the geospatial modeling system of FIGS. 1a and 1b.

Referring briefly to FIGS. 13-14, in certain embodiments, and as disclosed in U.S. Patent Application Publication No. 2006/0013443 to McDowall et al., also assigned to the present application's assignee and the entire contents of which are incorporated by reference herein, the processor 22 may further cooperate with the geospatial model 21 database for aligning based upon the ICP calculations using a binary search tree 125. For example, the processor 22 may create a binary search tree by recursively dividing points in X and Y directions and traversing the binary search tree to find nearest points.

In the diagram 120, there is shown a set of points (P1-P10) representing a surface for one frame, such as, a frame of LIDAR points. At each step, the region is split into two regions, each region containing half of the points. This process is repeated until each point is in its own region by itself. As an example, if one starts with 8 points and is looking for a particular point, cut it down to four points by querying which half it is located in, then down to two, and finally to one. This is completed in just three steps, which is easier than completing all eight points. The difference is proportional to the number of points there are. If there are 256 points, one can usually find a point in eight tries instead of 256.

The processor 22 generates lines L1-L8. These lines are used to build a two-dimensional, i.e. binary, tree 125 and shown in FIG. 14. As will be appreciated by those skilled in the art, the two-dimensional tree 125 shown here is exemplary, the geospatial modeling system 20 disclosed above uses a three-dimensional tree. The two-dimensional tree 125 is created by recursively dividing the points P1-P10 in x and y directions. In the two-dimensional tree 125, each line of FIG. 13 is represented by a node (circles) and each point (rectangle) is connected to a node. The tree is used to reduce the searching time required to find the point closest to any given point. For example, if searching for the point closest to P10, one would traverse node L1 to L3, and then to L7 and consider only point P9 and not P1.

Figure 15:
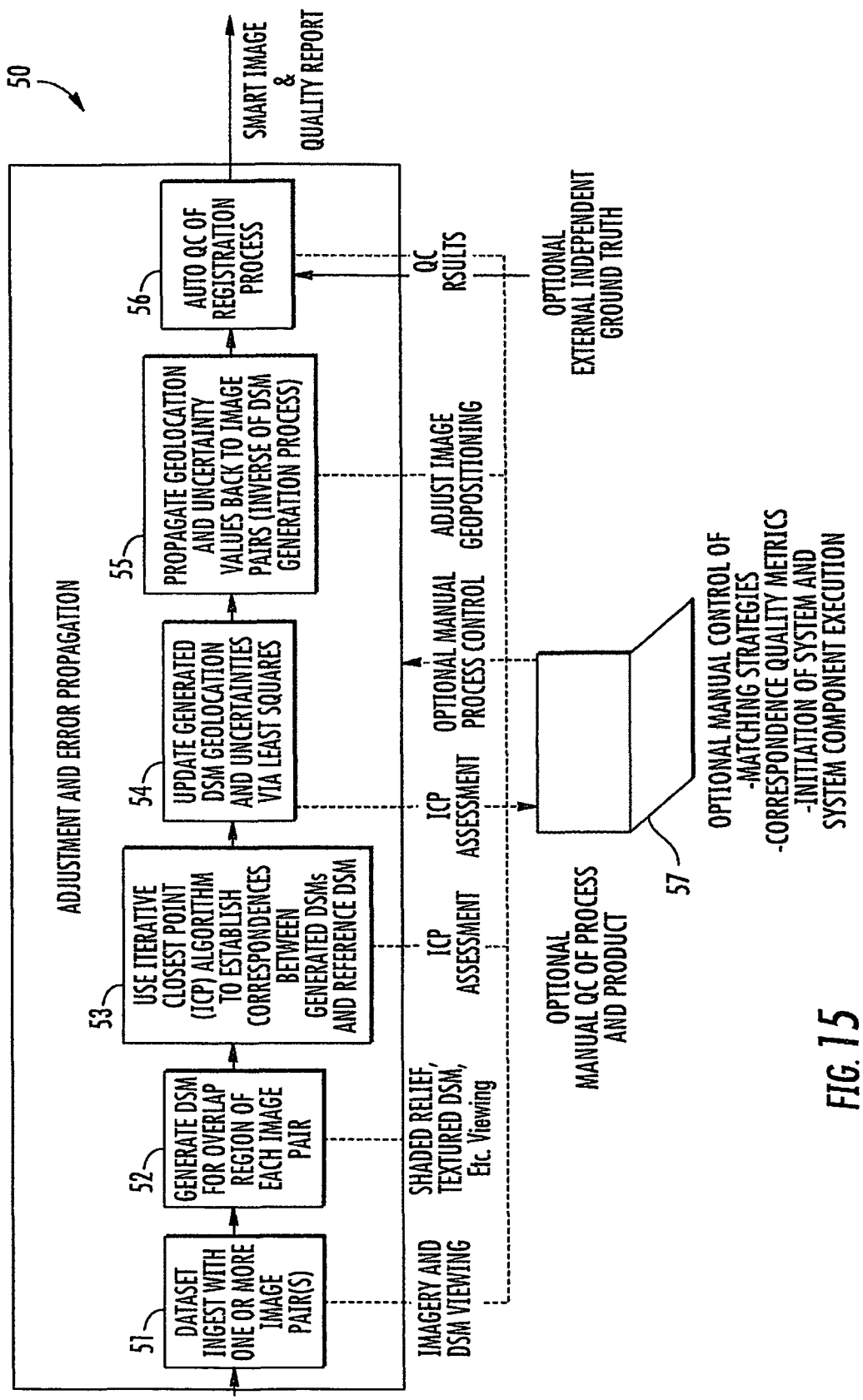
FIG. 15 is a detailed schematic diagram of a geospatial modeling system according to the present invention.

Referring to FIG. 15, as will be appreciated by those skilled in the art, an exemplary implementation 50 of the geospatial modeling system 20 is illustrated and now described. At processing module 51, the exemplary geospatial modeling system 50 receives one or more pairs of images for ingest processing. The exemplary geospatial modeling system 50 illustratively includes processing module 52 for generation of a DSM for overlapping regions of each image pair, and processing module 53 for using ICP to determined correspondences between the generated DSM and the reference DSM.

At processing module 54, the exemplary geospatial modeling system 50 updates the generated DSM geolocation and uncertainties via least squares calculations. The exemplary geospatial modeling system 50 illustratively includes an optional manual control of matching strategies, correspondence metrics, and initiation of system and system component execution, illustrated as a laptop 57. The exemplary geospatial modeling system 50 illustratively includes propagating geolocation and uncertainty values back to image pairs at processing module 55, and an auto quality control at processing module 56. The auto quality control at processing module 56 may be manual or computer drive, for example, using edge detection.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
a geospatial model database configured to store a plurality of images of a geographical area and a reference digital surface model (DSM) of the geographical area, the plurality of images each having associated therewith respective first geolocation data with a first accuracy, the reference DSM including second geolocation data with a second accuracy being greater than the first accuracy; and
a processor cooperating with said geospatial model database and configured to
generate an initial DSM based upon overlapping portions of the plurality of images, and
align the initial DSM based upon the reference DSM to generate a georeferenced DSM having a third accuracy greater than the first accuracy.

2. The geospatial modeling system according to claim 1 wherein the third accuracy is greater than the second accuracy.

3. The geospatial modeling system according to claim 1 wherein said processor further cooperates with said geospatial model database and is configured to generate updated respective first geolocation data for each of the plurality of images based upon the georeferenced DSM.

4. The geospatial modeling system according to claim 1 wherein said processor further cooperates with said geospatial model database and is configured to generate the third accuracy based upon least squares calculations.

5. The geospatial modeling system according to claim 1 wherein said processor further cooperates with said geospatial model database and is configured to align based upon iterative closest point (ICP) calculations.

6. The geospatial modeling system according to claim 5 wherein said processor further cooperates with said geospatial model database and is configured to align based upon the ICP calculations using a binary search tree.

7. The geospatial modeling system according to claim 1 wherein said processor further cooperates with said geospatial model database and is configured to generate the initial DSM by at least:
correlating patches from the plurality of images to form a correlation surface;
determining peaks of the correlation surface; and
determining correspondence pairs based upon respective locations of the peaks of the correlation surface.

8. The geospatial modeling system according to claim 1 wherein the plurality of images comprises aerial earth images.

9. The geospatial modeling system according to claim 1 wherein the reference DSM is based upon Light Detection and Ranging (LIDAR) data.

10. A geospatial modeling system comprising:
a geospatial model database configured to store a plurality of images of a geographical area and a reference digital surface model (DSM) of the geographical area, the plurality of images each having associated therewith respective first geolocation data with a first accuracy, the reference DSM including second geolocation data with a second accuracy being greater than the first accuracy; and
a processor cooperating with said geospatial model database and configured to
generate an initial DSM based upon overlapping portions of the plurality of images,
align the initial DSM based upon the reference DSM to generate a georeferenced DSM having a third accuracy greater than the first and second accuracies, and
generate updated respective first geolocation data for each of the plurality of images based upon the georeferenced DSM.

11. The geospatial modeling system according to claim 10 wherein said processor further cooperates with said geospatial model database and is configured to generate the third accuracy based upon least squares calculations.

12. The geospatial modeling system according to claim 10 wherein said processor further cooperates with said geospatial model database and is configured to align based upon iterative closest point (ICP) calculations.

13. The geospatial modeling system according to claim 12 wherein said processor further cooperates with said geospatial model database and is configured to align based upon the ICP calculations using a binary search tree.

14. A computer implemented method for geospatial modeling using a plurality of images of a geographical area and a reference digital surface model (DSM) of the geographical area, the plurality of images each having associated therewith respective first geolocation data with a first accuracy, the reference DSM including second geolocation data with a second accuracy being greater than the first accuracy, the method comprising:
generating an initial DSM based upon overlapping portions of the plurality of images;
aligning the initial DSM based upon the reference DSM to generate a georeferenced DSM having a third accuracy greater than the first accuracy; and
displaying at least one image based upon the georeferenced DSM.

15. The computer implemented method according to claim 14 wherein the third accuracy is greater than the second accuracy.

16. The computer implemented method according to claim 14 further comprising generating updated respective first geolocation data for each of the plurality of images based upon the georeferenced DSM.

17. The computer implemented method according to claim 14 wherein the aligning includes generating the third accuracy based upon least squares calculations.

18. The computer implemented method according to claim 14 wherein the aligning is based upon iterative closest point (ICP) calculations.

19. The computer implemented method according to claim 18 wherein the aligning comprises aligning based upon the ICP calculations using a binary search tree.

20. The computer implemented method according to claim 14 wherein the generating of the initial DSM comprises:
   correlating patches from the plurality of images to form a correlation surface;
   determining peaks of the correlation surface; and
   determining correspondence pairs based upon respective locations of the peaks of the correlation surface.

* * * * *